United States Patent
Smith et al.

(10) Patent No.: US 11,771,073 B2
(45) Date of Patent: Oct. 3, 2023

(54) MOSQUITO CONTROL DEVICES AND SYSTEMS

(71) Applicant: MAXTECH MOSQUITO CONTROL INC., Waterloo (CA)

(72) Inventors: Mark James Smith, Kitchener (CA); Kailash C. Vasudeva, Waterloo (CA); Satnam Singh, Kitchener (CA)

(73) Assignee: Maxtech Mosquito Control Inc., Ontario (CA)

( * ) Notice: Subject to any disclaimer, the term of this patent is extended or adjusted under 35 U.S.C. 154(b) by 278 days.

(21) Appl. No.: 16/970,195

(22) PCT Filed: Feb. 15, 2019

(86) PCT No.: PCT/CA2019/050191
§ 371 (c)(1),
(2) Date: Aug. 14, 2020

(87) PCT Pub. No.: WO2019/157600
PCT Pub. Date: Aug. 22, 2019

(65) Prior Publication Data
US 2021/0076655 A1    Mar. 18, 2021

(30) Foreign Application Priority Data
Feb. 16, 2018  (CA) ...................... 2995537

(51) Int. Cl.
*A01M 1/02* (2006.01)
*A01M 1/04* (2006.01)
(Continued)

(52) U.S. Cl.
CPC .............. *A01M 1/023* (2013.01); *A01M 1/04* (2013.01); *A01M 1/223* (2013.01); *H05B 47/19* (2020.01);
(Continued)

(58) Field of Classification Search
CPC .... A01M 1/04; A01M 1/06–08; A01M 1/023; A01M 1/22; A01M 1/223
See application file for complete search history.

(56) References Cited

U.S. PATENT DOCUMENTS 1,445,906 A * 2/1923 Noonan ................. A01M 1/08
43/113
1,693,368 A * 11/1928 Cherry .................... A01M 1/08
55/510

(Continued)

FOREIGN PATENT DOCUMENTS

CA     2974214 A1    3/2017
CA     2773657 C  *  9/2017    .............. A01M 1/02
(Continued)

OTHER PUBLICATIONS

"What is a server" Mitchell, Jun. 12, 2021, Lifewire (Year: 2021).*
(Continued)

*Primary Examiner* — Peter M Poon
*Assistant Examiner* — Morgan T Jordan
(74) *Attorney, Agent, or Firm* — Bereskin & Parr LLP (57) ABSTRACT

A mosquito control device includes a connector positioned at a first end of the device. The connector couples to a light bulb socket to provide power to the device. The device also includes an LED light source positioned at a second end of the device and an electrocuting mechanism disposed between the connector and the LED light source. The electrocuting mechanism electrocutes the mosquitos upon contact. The device also includes a carbon dioxide generating device that generates and releases carbon dioxide to attract the mosquitos to the device. The device also includes a heater that generates and releases heat to attract the mosquitos to the device.

19 Claims, 5 Drawing Sheets

(51) Int. Cl.
*A01M 1/22* (2006.01)
*H05B 47/19* (2020.01)
*F21Y 115/10* (2016.01)
*H05B 45/00* (2022.01)

(52) U.S. Cl.
CPC .... *A01M 2200/012* (2013.01); *F21Y 2115/10* (2016.08); *H05B 45/00* (2020.01)

(56) References Cited

U.S. PATENT DOCUMENTS

| | | | | |
|---|---|---|---|---|
| 1,770,626 | A * | 7/1930 | Richards | A01M 1/08 43/113 |
| 2,132,371 | A * | 10/1938 | Kriwat | A01M 1/02 43/112 |
| 3,123,933 | A * | 3/1964 | Roche | A01M 1/08 43/139 |
| 3,319,374 | A * | 5/1967 | Gawne | A01M 1/08 43/112 |
| 4,603,505 | A * | 8/1986 | Millard | A01M 1/223 362/179 |
| 4,908,978 | A * | 3/1990 | Zacharias | A01M 1/223 43/111 |
| 4,951,414 | A * | 8/1990 | Mewissen | A01M 1/223 43/112 |
| 5,020,270 | A * | 6/1991 | Lo | A01M 1/08 43/112 |
| 5,136,802 | A * | 8/1992 | Chen | A01M 1/08 43/111 |
| 5,157,865 | A * | 10/1992 | Chang | A01M 1/08 43/113 |
| 5,167,090 | A * | 12/1992 | Cody | A01M 1/06 43/139 |
| 5,301,456 | A * | 4/1994 | Jobin | A01M 1/04 43/113 |
| 5,311,697 | A * | 5/1994 | Cavanaugh | A01M 1/08 43/132.1 |
| 5,647,164 | A * | 7/1997 | Yates | A01M 1/023 43/132.1 |
| 6,050,025 | A * | 4/2000 | Wilbanks | A01M 1/223 43/112 |
| 6,088,949 | A * | 7/2000 | Nicosia | A01M 1/023 43/132.1 |
| 6,134,826 | A * | 10/2000 | Mah | A01M 1/223 43/99 |
| 6,195,932 | B1 | 3/2001 | Aicher | |
| 6,275,651 | B1 * | 8/2001 | Voit | A61L 9/03 422/125 |
| 6,425,202 | B1 * | 7/2002 | Lin | A01M 1/2016 43/132.1 |
| 6,594,946 | B2 * | 7/2003 | Nolen | A01M 1/223 43/107 |
| 6,898,896 | B1 * | 5/2005 | McBride | A01M 1/08 43/107 |
| 8,026,822 | B2 * | 9/2011 | Borth | A01M 23/38 340/573.2 |
| 8,109,036 | B1 * | 2/2012 | Wilbanks | A01M 1/223 43/112 |
| 8,973,300 | B1 * | 3/2015 | Smith | A01M 1/103 43/132.1 |
| 9,664,813 | B2 * | 5/2017 | Janét | A01M 1/04 |
| 9,968,080 | B1 | 5/2018 | Van Kleef | F21V 15/01 |
| 10,021,869 | B1 | 7/2018 | Cogley | A01M 5/02 |
| 10,021,871 | B1 | 7/2018 | Cogley | A01M 1/06 |
| 10,045,521 | B2 | 8/2018 | Zheng et al. | |
| 10,337,675 | B2 * | 7/2019 | Van Kleef | F21K 9/23 |
| 10,701,924 | B2 * | 7/2020 | Zheng | A01M 1/08 |
| 10,905,111 | B2 * | 2/2021 | Zhang | F21V 33/00 |
| 2002/0116865 | A1 * | 8/2002 | Lin | A01M 1/2016 43/107 |
| 2003/0070346 | A1 * | 4/2003 | Winner | F23D 14/28 43/112 |
| 2003/0172581 | A1 * | 9/2003 | Nosse | A01M 1/08 43/113 |
| 2005/0019361 | A1 * | 1/2005 | Durand | A01M 1/02 424/405 |
| 2005/0066570 | A1 * | 3/2005 | Mosher, II | A01M 1/02 43/139 |
| 2005/0274061 | A1 * | 12/2005 | Zhu | A01M 1/06 43/132.1 |
| 2006/0179708 | A1 * | 8/2006 | Garland | A01M 29/12 43/132.1 |
| 2006/0260183 | A1 * | 11/2006 | Hockaday | A01M 1/08 43/132.1 |
| 2007/0011940 | A1 * | 1/2007 | Chen | A01M 1/023 43/107 |
| 2007/0056207 | A1 | 3/2007 | Chen | |
| 2007/0256351 | A1 * | 11/2007 | Milton | A01M 1/08 43/132.1 |
| 2008/0148624 | A1 * | 6/2008 | Borth | A01M 1/2022 43/132.1 |
| 2009/0293341 | A1 * | 12/2009 | Fleming | A01M 1/2055 43/131 |
| 2012/0285076 | A1 * | 11/2012 | Banfield | A01M 1/14 43/132.1 |
| 2013/0125449 | A1 * | 5/2013 | Winston | A01M 13/00 43/125 |
| 2013/0142753 | A1 * | 6/2013 | Prohaska | A61C 1/084 43/107 |
| 2014/0137462 | A1 * | 5/2014 | Rocha | A01M 1/023 43/113 |
| 2014/0165452 | A1 * | 6/2014 | Rocha | A01M 1/08 43/139 |
| 2014/0352200 | A1 * | 12/2014 | Tremble | A01M 1/223 43/112 |
| 2015/0070895 | A1 * | 3/2015 | Yotsumoto | F21V 3/00 362/253 |
| 2016/0050901 | A1 * | 2/2016 | Pugh | A01M 1/2011 43/112 |
| 2017/0071184 | A1 | 3/2017 | Zheng et al. | |
| 2017/0231211 | A1 * | 8/2017 | Kupfer | A01M 1/2005 43/113 |
| 2017/0367314 | A1 * | 12/2017 | Billingsley, Jr. | H05B 47/19 |
| 2018/0000093 | A1 * | 1/2018 | Nchekwube | A01M 1/226 |
| 2018/0116195 | A1 * | 5/2018 | Zhang | A01M 1/106 |
| 2018/0125052 | A1 * | 5/2018 | Johnson | A01M 1/023 |
| 2018/0199563 | A1 | 7/2018 | Zheng et al. | |
| 2018/0206472 | A1 * | 7/2018 | Maxik | A01M 1/06 |
| 2018/0279598 | A1 * | 10/2018 | Hur | A01M 1/106 |
| 2018/0332839 | A1 * | 11/2018 | Beach | A01M 1/026 |
| 2019/0159440 | A1 * | 5/2019 | Zheng | A01M 1/223 |
| 2019/0159441 | A1 * | 5/2019 | Zheng | A01M 1/023 |
| 2020/0107534 | A1 * | 4/2020 | Zheng | A01M 1/08 |

FOREIGN PATENT DOCUMENTS

| | | | | |
|---|---|---|---|---|
| CN | 105423223 A | * | 3/2016 | ............ A01M 1/023 |
| CN | 106376539 A | * | 2/2017 | |
| CN | 106376539 A | | 2/2017 | |
| DE | 202016105004 U1 | | 11/2016 | |
| EP | 3351098 A1 | | 7/2018 | |
| JP | 2015042157 A | | 3/2015 | |
| KR | 20120021832 A | * | 3/2012 | ............ A01M 1/023 |
| WO | WO-8912389 A1 | * | 12/1989 | |
| WO | WO-9944417 A2 | * | 9/1999 | ............ A01M 1/023 |
| WO | WO-0003588 A1 | * | 1/2000 | ............ A01M 1/023 |
| WO | WO-2005120224 A1 | * | 12/2005 | ............ A01M 1/02 |
| WO | WO-2015145789 A1 | * | 10/2015 | ............ A01M 1/023 |
| WO | 2017045092 A1 | | 3/2017 | |
| WO | 2017120189 A1 | | 7/2017 | |

(56) References Cited

FOREIGN PATENT DOCUMENTS

WO     WO-2017159918 A1 *   9/2017  ............ A01M 1/023
WO         2018017982 A1     1/2018

OTHER PUBLICATIONS

International Preliminary Report on Patentability dated Aug. 27, 2020 in related International Patent Application No. PCT/CA2019/050191 (9 pages).

* cited by examiner

MOSQUITO CONTROL DEVICES AND SYSTEMS

CROSS-REFERENCE TO RELATED APPLICATION

This application is a National Stage of International Application No. PCT/CA2019/050191 filed on Feb. 15, 2019, which claims the benefit of priority from Canadian Patent Application No. 2,995,537, filed Feb. 16, 2018, the entire content of which is hereby incorporated by reference.

TECHNICAL FIELD

The embodiments disclosed herein relate to systems and devices for pest control and, in particular to systems and devices for controlling mosquitos.

BACKGROUND

There are many pest control devices (e.g. pest control light bulbs) available with minor variations in shape and function. Some of these devices include additional functions beyond providing light and killing pests (e.g. flying insects). Most LED lamps included in these devices are used to attract flying insects in general, but do not specifically attract mosquitoes.

Further, pest control devices are generally stand-alone products and are not a part of broader smart home systems that incorporate other features of the smart technology available today.

SUMMARY

This summary is intended to introduce the reader to the more detailed description that follows and not to limit or define any claimed or as yet claimed invention. One or more inventions may reside in any combination or sub-combination of the elements or process steps disclosed in any part of this document including its claims and figures.

According to one broad aspect, a mosquito control device is provided. The device includes a connector positioned at a first end of the device, the connector configured to couple to a light bulb socket to provide power to the device; an LED light source positioned at a second end of the device; an electrocuting mechanism disposed between the connector and the LED light source, the electrocuting mechanism configured to electrocute the mosquitos upon the mosquitos upon contact; a carbon dioxide generating device configured to generate and release carbon dioxide to attract the mosquitos to the device; and a heater configured to generate and release heat to attract the mosquitos to the device.

The carbon dioxide generating device may be configured to generate and release a volume of carbon dioxide that mimics a volume of carbon dioxide released by a human to attract the mosquitos to the device.

The carbon dioxide generating device may include ammonium bicarbonate and the carbon dioxide is generated by heating the ammonium bicarbonate.

The carbon dioxide generating device may be thermally coupled to the heater to receive heat generated by the heater to generate the carbon dioxide.

The heater may be configured to heat a region surrounding the device to a temperature that mimics a temperature of a human to attract the mosquitos to the device.

The heater may be positioned adjacent to the carbon dioxide generating device.

The heater may be a silicon-based heater.

The device may also include a mosquito lure storage unit configured to controllably release an odor to attract the mosquitos to the device.

The mosquito lure storage unit may include a mosquito lure material that releases the odor to attract the mosquitos to the device.

The mosquito lure material may include an attractant material such as any one of or a mixture of two or more of sulcatone ($C_8H_{14}O$), lactic acid ($C_3H_6O_3$), 1-octen-3-ol, nonanal, and natural spearmint oil.

The mosquito lure storage unit may be coupled to the carbon dioxide generating device.

The device may also include one or more UV lights to attract the mosquitos to the device.

The device may also include a camera configured to capture images of a region surrounding the device.

The device may also include a processing unit coupled to the LED light source, electrocuting mechanism, the carbon dioxide generating device and/or the heater, the processing unit operable to generate a control signal for any one or more of the LED light source, electrocuting mechanism, the carbon dioxide generating device and/or the heater; and at least one communication interface operable to communicate via at least one communication network to an external device.

According to another broad aspect, a system for controlling mosquitos is provided. The system includes at least one communication network; a mosquito control device comprising a connector positioned at a first end of the device, the connector configured to couple to a light bulb socket to provide power to the device; an LED light source positioned at a second end of the device; an electrocuting mechanism disposed between the connector and the LED light source, the electrocuting mechanism configured to electrocute the mosquitos upon the mosquitos contacting the electrocuting mechanism; a carbon dioxide generating device configured to generate and release carbon dioxide to attract the mosquitos to the device; and a heater configured to generate and release heat to attract the mosquitos to the device; a processing unit coupled to the LED light source, electrocuting mechanism, the carbon dioxide generating device and/or the heater, the processing unit operable to generate a control signal for any one or more of the LED light source, electrocuting mechanism, the carbon dioxide generating device and/or the heater; and at least one communication interface operable to communicate via the at least one communication network to an external device; and a server comprising: a server storage unit to store data from the mosquito control device; at least one server communication interface operable to communicate with the mosquito control device and at least one user computing device via the at least one communication network; and a server processing unit operable to count a number of times that a mosquito is electrocuted by the electric mosquito control mechanism.

The server processing unit may be operable to control the heater.

The server processing unit may be operable to automatically control the heater based on a signal received from the mosquito control device.

The server processing unit may be operable to control the heater based on a signal received from the user computing device.

The server processing unit may be operable to control the $CO_2$ generating device.

The server processing unit may be operable to automatically control the control the $CO_2$ generating device based on a signal received from the mosquito control device.

The server processing unit may be operable to control the control the $CO_2$ generating device based on a signal received from the user computing device.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings.

The drawings included herewith are for illustrating various examples of articles, methods, and apparatuses of the teaching of the present specification and are not intended to limit the scope of what is taught in any way.

DETAILED DESCRIPTION

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

Terms of degree such as "about" and "approximately" as used herein mean a reasonable amount of deviation of the modified term such that the end result is not significantly changed. These terms of degree should be construed as including a deviation of at least ±5% or at least ±10% of the modified term if this deviation would not negate the meaning of the word it modifies.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

As used herein and in the claims, two or more parts are said to be "coupled", "connected", "attached", or "fastened" where the parts are joined or operate together either directly or indirectly (i.e., through one or more intermediate parts), so long as a link occurs. As used herein and in the claims, two or more parts are said to be "directly coupled", "directly connected", "directly attached", or "directly fastened" where the parts are connected in physical contact with each other. None of the terms "coupled", "connected", "attached", and "fastened" distinguish the manner in which two or more parts are joined together.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

Figure 1:
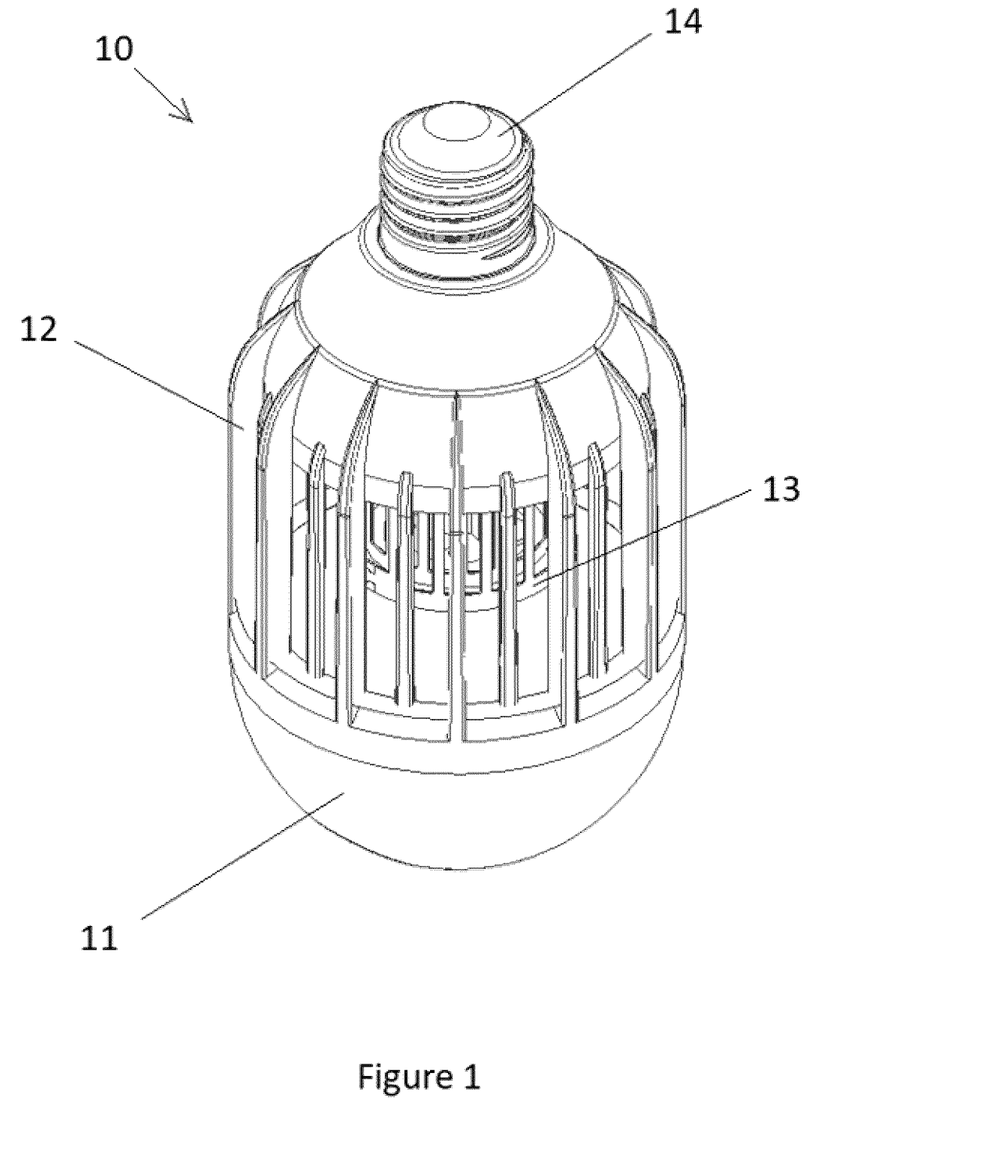
FIG. 1 shows an isometric view of a mosquito control device according to one embodiment.

FIG. 1 shows an isometric view of a mosquito control device 10 according to one embodiment. Device 10 includes a light dome 11, a body 12 and a connector 14. Connector 14 and light dome 11 are generally opposed to each other on opposite ends of the device 10. Light dome 11 can be made of a translucent plastic or mirror finished clear plastic.

Body 12 is made of high heat/high impact plastic material with ribbed structure to allow mosquitoes and/or other flying insects to fly through body 12 towards electric grid (e.g. electrocuting mechanism) 13 disposed therein. Electric grid 13 is configured to electrocute mosquitos upon contact. In some embodiments, electric grid 13 has about 400V-AC power.

Connector 14 is generally configured to couple to a light bulb socket to provide power to the device 10. Connector 14 can be made to a standard shape such as but not limited to E26, E27, B22 standard or the like. Connector 14 is generally coupled to body 12.

Figure 2:
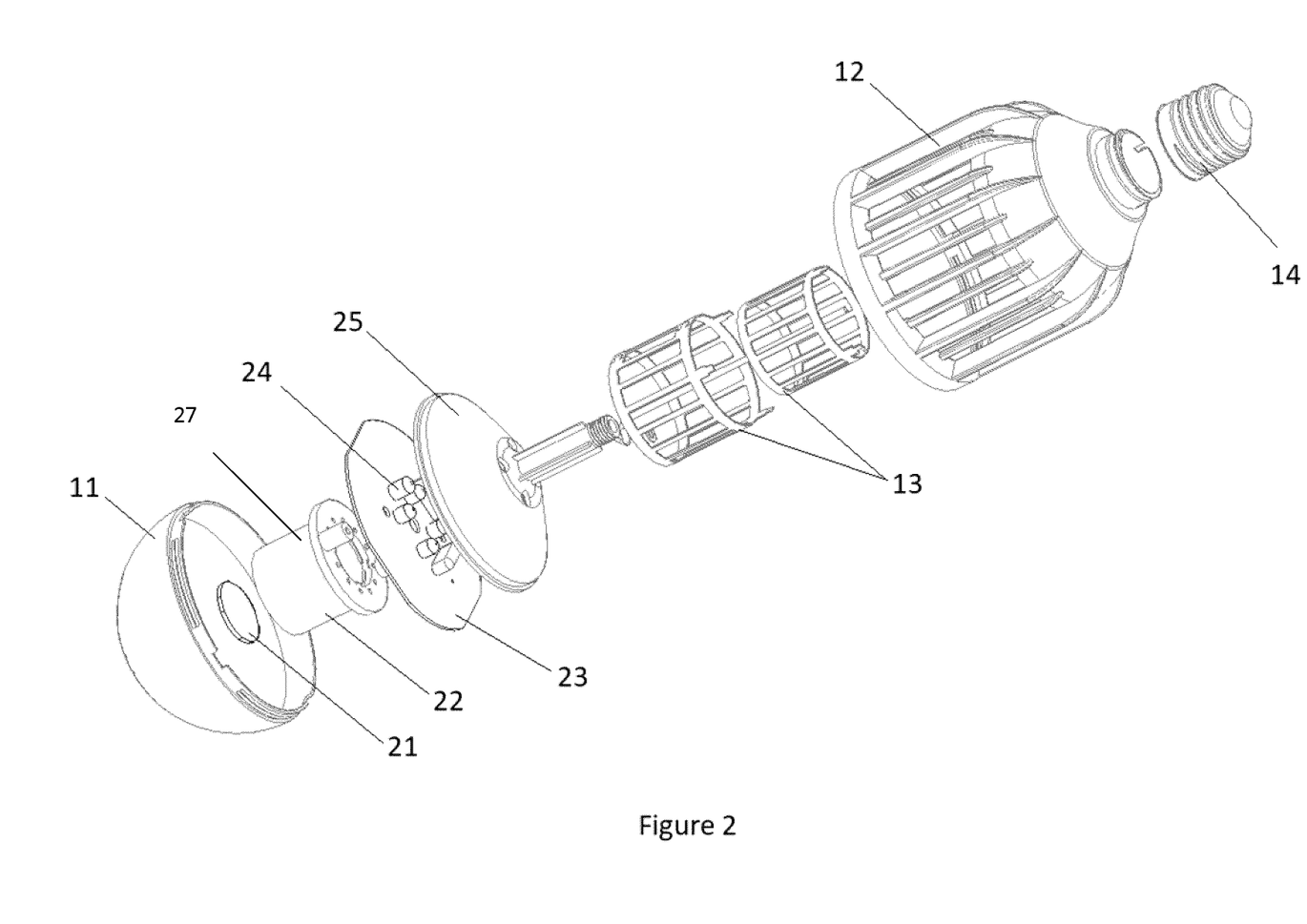
FIG. 2 is an exploded view of the mosquito control device of FIG. 1.

FIG. 2 shows an exploded view of the device 10 of FIG. 1. Device 10 includes a heating element (e.g. heater) 21 that is configured to generate and release heat. Heating element 21 may generate and release heat to mimic heat from a human body and act as an attractant for mosquitoes (e.g. female mosquitos).

Heating element 21 may be configured to heat a region surrounding the device 10 to a temperature that mimics a temperature of a human to attract the mosquitos to the device. Heating element 21 may be positioned adjacent to the carbon dioxide generating device 21. The heater 21 may be a silicon-based material capable of generating heat.

In other embodiments, heating element 21 may be any device capable of generating heat. For instance, in some embodiments, heating element 21 may include one or more resistors thermally coupled to a heating plate (e.g. an aluminum plate). In this embodiment, the resistors may be thermally coupled (e.g. glued to the back of) the heating plate and a current can pass through the resistors to generate heat and heat the plate.

Device 10 also includes a carbon dioxide ($CO_2$) generating device 22. $CO_2$ generating device 22 is configured to generate and release a volume of $CO_2$ that mimics a volume of $CO_2$ from human breath. In this manner, $CO_2$ generating device 22 generally acts as another attractant for mosquitoes (e.g. female mosquitos). $CO_2$ generating device 22 may include a $CO_2$ generating material such as but not limited to ammonium bicarbonate. The $CO_2$ generating device 22 may be configured to provide for refilling a $CO_2$ generating material contained therein. In some embodiments, $CO_2$ generating device 22 is thermally coupled to the heater 21 to receive heat generated by the heater to generate the carbon dioxide (e.g. by heating the $CO_2$ generating material such as but not limited to ammonium bicarbonate).

Device 10 may also include a mosquito lure storage unit 27 configured to controllably release an odor to attract the mosquitos to the device 10. Mosquito lure storage unit 27 may include a mosquito lure material that releases the odor to attract the mosquitos to the device 10. The mosquito lure material may include but is not limited to attractants such as essential oils and simulated materials that are found in human scent, such as but not limited to any one or mixture including two or more of the following: sulcatone ($C_8H_{14}O$), lactic acid ($C_3H_6O_3$), 1-octen-3-ol, nonanal, and natural spearmint oil. Mosquito lure storage unit 27 may be included in (as shown) or coupled to the $CO_2$ generating device 22.

Device 10 also includes a printed circuit board (PCB) 23. PCB 23 carries electronic components for controlling at least the heating element 21, the $CO_2$ generating device 22 and the LED lights (described below). PCB 23 can be of single layer or multi-layer construction.

In some embodiments, PCB 23 also carries a set of ultraviolet-light emitting diode (UV LED) lamps (e.g. 350-370 nm) 24 on one face of the PCB 23. The set of UV LED lamps 24 also act as attractant for flying insects (e.g. mosquitos) in general.

In some embodiments, another face of PCB 23 (e.g. an opposed face to the face that carries the set of UV LED lamps 24) carries a set of white LEDs 26 for illumination of up to 900 lumens that act as a light source.

In some embodiments, device 10 includes a support pillar 25 that acts as a connecting element for to secure one or more of the above described elements within the device 10. Support pillar 25 may be made of high strength/high heat plastic material, for example.

Figure 3:
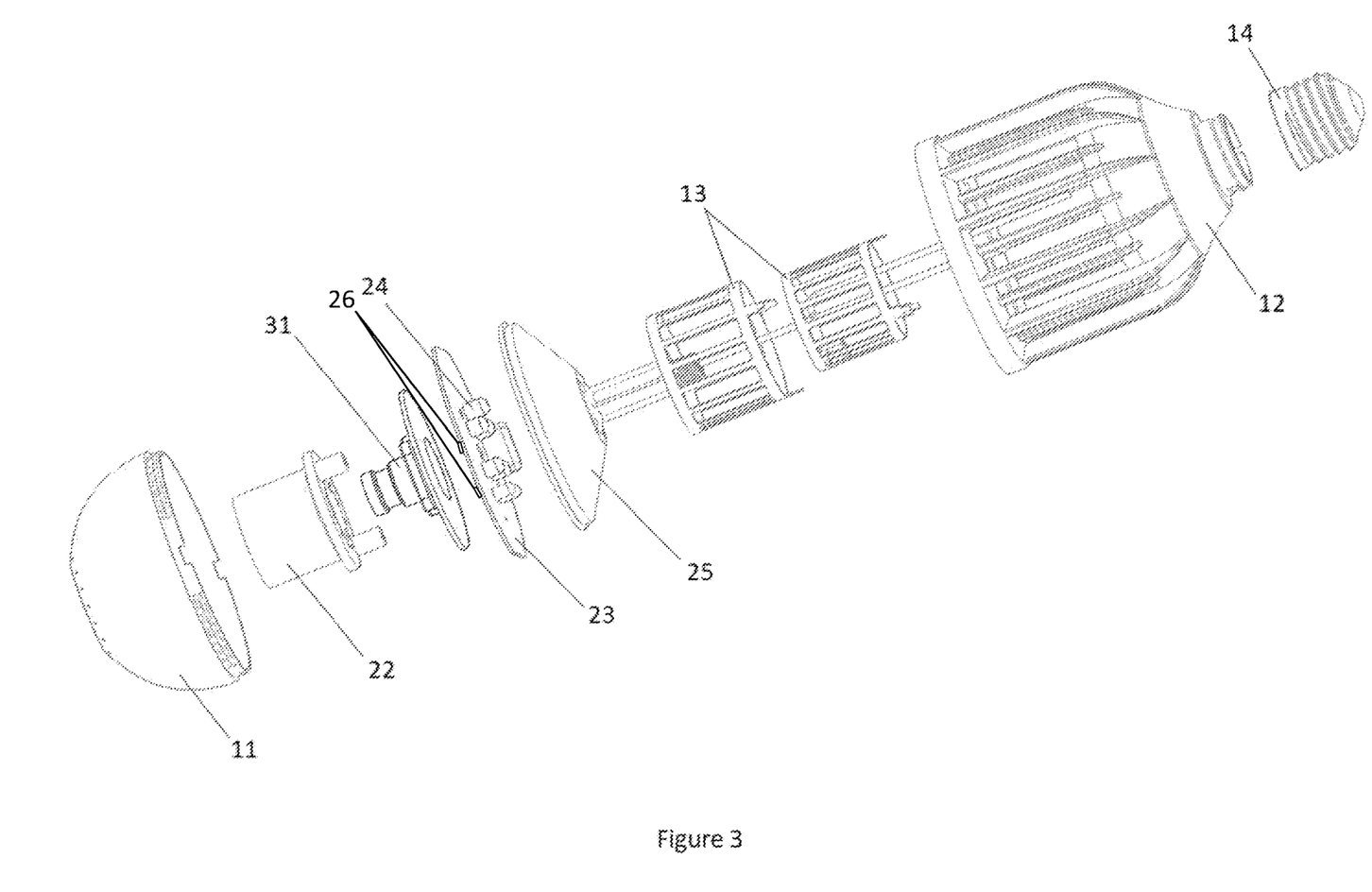
FIG. 3 is an exploded view of a mosquito control device according to another embodiment.

Turning now to FIG. 3, illustrated therein is an exploded view of a device 30 for controlling mosquitos. Device 30 further includes a camera 31 (e.g. a high definition (HD) digital camera). Camera 31 is also coupled to the PCB 23. Camera 31, via PCB 23, may communicate with an external device via built-in or remote smart devices (as described below) to detect annoying rodents, reptiles, birds etc. surrounding the device 30. In some embodiments, the external device (or a further external device connected thereto) may further trigger repelling sounds to dispel such creatures. The camera 31 may also act as part of a home security system (described below). The camera 31 may have a wide angle (e.g. fish-eye) lens or may have a 360-degree oscillating function.

Figure 4:
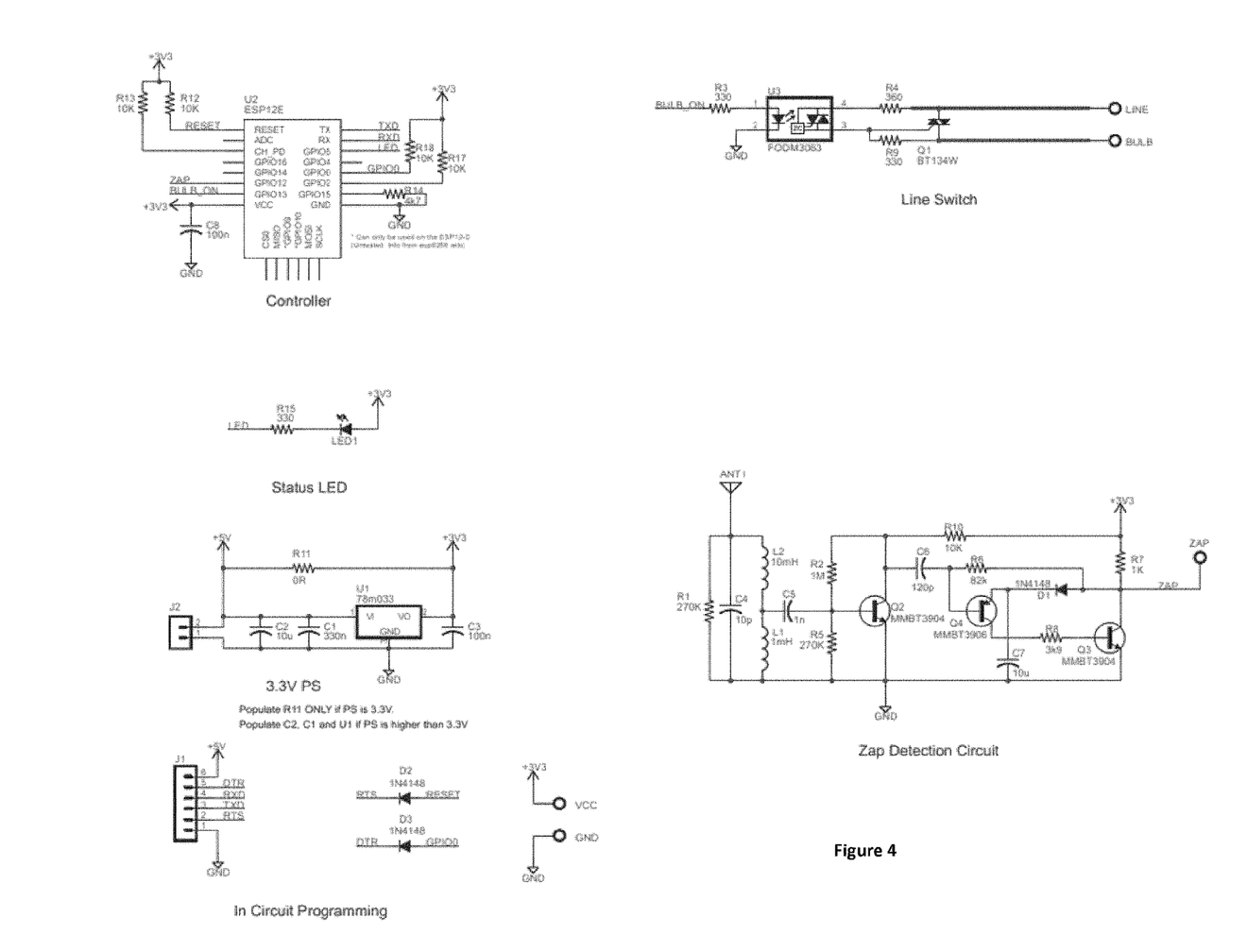
FIG. 4 is a circuit diagram of a mosquito control device according to at least one embodiment.

Turning now to FIG. 4, illustrated therein are circuit diagrams of various components of a mosquito control device, according to at least one embodiment.

Figure 5:
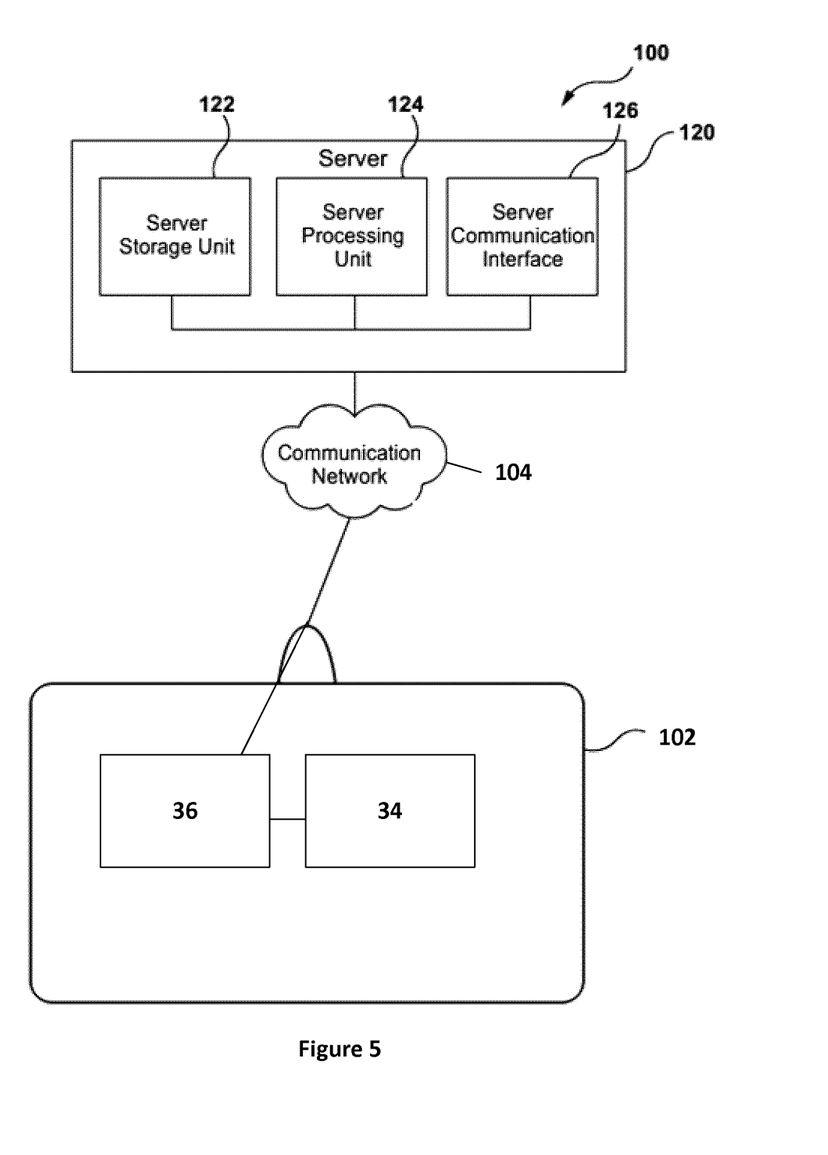
FIG. 5 is a block diagram of a mosquito control system, according to one embodiment.

In some embodiments, as shown in FIG. 5, illustrated therein is a system 100 for controlling mosquitos. The system 100 includes a mosquito control device 102, a communication network 104 and an external device 120.

The mosquito control device 102 can include any of the features previously described with respect to devices 10 and 30.

The mosquito control device 102 may also include a processing unit 34 and a communication interface 36.

In some embodiments, the processing unit 34 may facilitate the operation of the electric grid 13, heater 21, $CO_2$ generating mechanism 22, UV LED lights 24, and/or LEDs 26, The processing unit 34 can include any suitable processors, controllers or digital signal processors that can provide sufficient processing power depending on the configuration, purposes and requirements of the device 10. In some embodiments, the processing unit 34 can include more than one processing unit with each processing unit being configured to perform different dedicated tasks.

The communication interface 36 can include any component for facilitating communication with other components of the system 100 via the communication network 130. For example, the communication interface 36 can include a wireless transceiver for communicating within a wireless communications network 104. For instance, the communication interface 36 can communicate identification data and/or operating data of the device 102 to the communication network 104. The communication interface 36 can receive commands from the communication network 104.

External device 120 (e.g. server) includes a server storage unit 122 to store data from the mosquito control device 102; at least one server communication interface 123 operable to communicate with the mosquito control device 102 and at least one user computing device via the at least one communication network 104; and a server processing unit 124. operable to count a number of times that a mosquito is electrocuted by the electric mosquito control mechanism.

The server storage unit 122 can store data generated by the server processing unit 124 and data received from the device 102, user computing devices (not shown in FIG. 5), other sensor units and output devices (not shown in FIG. 5). For example, the server storage unit 122 can store data in respect of the operation of the system 100, such as authorization data, access management data of the device 102.

The server storage unit 122 can also store computer programs that are executable by the server processing unit 124. For example, the computer programs can facilitate communication between the server 120 and the devices 102. Another example computer program can be an home security or smart home processing application. The server storage unit 122 can also store computer programs that are downloadable and executable by user computing devices to facilitate communication between the server 120 and the user computing devices.

The server processing unit 124 can control the operation of the server 120. The server processing unit 124 may be any suitable processing units, controllers or digital signal processors that can provide sufficient processing power depending on the configuration, purposes and requirements of the server 120. In some embodiments, the server processing unit 124 can include more than one processing unit with each processing unit being configured to perform different dedicated tasks. The server processing unit 124 together with the device processing unit at devices 102 contribute to the control of the system 100.

The server communication interface 126 facilitates communication between the server 120 and the other components of the system 100, such as the device 102 and other sensor units and output devices, via the communication network 104. The server 120 can also connect to the Internet.

Some components of the server 120 may be virtualized in a cloud computing infrastructure. A cloud computing infrastructure can improve reliability and maintenance of the server. A cloud computing infrastructure can also allow a system 100 to manage client information and provide access control across a plurality of facilities.

In some embodiments, server processing unit 124 can operate to count a number of times that a mosquito is electrocuted by the electrocuting mechanism 13.

In some embodiments, server processing unit 124 is operable to control the heater (e.g. control a temperature of the heater).

In some embodiments, server processing unit 124 is operable to control the $CO_2$ generating device (e.g. control a volume of $CO_2$ generated by the $CO_2$ generating device).

In some embodiments, server processing unit 124 is operable to control the camera 310.

Device 102 may also include sensors to sense any one or more of the following: temperature of the device 102, amount of CO2 generating material in the device 102, CO2 generated by the device 102, concentration of odor generating material in the device 102, etc.

In some embodiments, the devices disclosed herein may also include a microphone or similar audio receiver to receive audio inputs (e.g. speech). In some embodiments, the audio inputs can be received by a processor of the device and the processor can control other components of the device described herein (e.g. the heater, the CO2 generator, etc.) based on the audio inputs. as well as external devices such as but not limited to smart home devices having virtual assistant technologies such as but not limited to devices that are compatible with Google Home® and Amazon Alexa®.

It should be noted that the devices described herein are capable of communicating, either directly or indirectly, with commercially available devices such as but not limited to Google Home and Amazon Alexa.

While the above description provides examples of one or more apparatus, methods, or systems, it will be appreciated that other apparatus, methods, or systems may be within the scope of the claims as interpreted by one of skill in the art.

What is claimed is:

1. A mosquito control device comprising:
    a connector positioned at a first end of the device, the connector configured to couple to a light bulb socket to provide power to the device;
    an electrocuting mechanism electrically coupled to the connector, the electrocuting mechanism configured to electrocute the mosquitos upon contact;
    a heater configured to generate and release heat to attract the mosquitos to the device, the heater being spaced apart from the electrocuting mechanism along a longitudinal axis of the device; and
    a carbon dioxide generating device positioned between the electrocuting mechanism and the heater along the longitudinal axis of the device, the carbon dioxide generating device positioned to receive a portion of the heat generated by and travelling upwards from the heater to generate carbon dioxide and release the carbon dioxide to attract the mosquitos to the device.

2. The device of claim 1, wherein the carbon dioxide generating device is configured to generate and release a volume of carbon dioxide that mimics a volume of carbon dioxide released by a human to attract the mosquitos to the device.

3. The device of claim 1, wherein the carbon dioxide generating device includes ammonium bicarbonate.

4. The device of claim 1, wherein the heater is configured to heat a region surrounding the device to a temperature that mimics a temperature of a human to attract the mosquitos to the device.

5. The device of claim 4, wherein the heater is positioned immediately adjacent to and below the carbon dioxide generating device when the connector is coupled to the light bulb socket.

6. The device of claim 4, wherein the heater is a silicon-based heater.

7. The device of claim 1, further comprising a mosquito lure storage unit configured to controllably release an odor to attract the mosquitos to the device.

8. The device of claim 7, wherein the mosquito lure storage unit includes a mosquito lure material that releases the odor to attract the mosquitos to the device.

9. The device of claim 7, wherein the mosquito lure material includes one or more of the following attractant materials: sulcatone ($C_8H_{14}O$), lactic acid ($C_3H_6O_3$), 1-octen-3-ol, nonanal, and natural spearmint oil.

10. The device of claim 7, wherein the mosquito lure storage unit is coupled to the carbon dioxide generating device.

11. The device of claim 1, further comprising one or more UV lights to attract the mosquitos to the device.

12. The device of claim 1, further comprising:
    a processing unit coupled to the electrocuting mechanism, the carbon dioxide generating device and/or the heater, the processing unit operable to generate a control signal for one or more of the electrocuting mechanism, the carbon dioxide generating device and/or the heater; and
    at least one communication interface operable to communicate via at least one communication network to an external device.

13. A system for controlling mosquitos, the system comprising:
    at least one communication network;
    a mosquito control device comprising:
        a connector positioned at a first end of the device, the connector configured to couple to a light bulb socket to provide power to the device;
        an electrocuting mechanism electrically coupled to the connector, the electrocuting mechanism configured to electrocute the mosquitos upon;
        a heater configured to generate and release heat to attract the mosquitos to the device, the heater being spaced apart from the electrocuting mechanism along a longitudinal axis of the device;
        a carbon dioxide generating device positioned between the electrocuting mechanism and the heater along the longitudinal axis of the device, the carbon dioxide generating device being positioned to receive a portion of the heat generated by and travelling upwards from the heater to generate carbon dioxide and release the carbon dioxide to attract the mosquitos to the device; and
        a processing unit coupled to the electrocuting mechanism, the carbon dioxide generating device and/or the heater, the processing unit operable to generate a control signal for one or more of the electrocuting mechanism, the carbon dioxide generating device and/or the heater; and
    at least one communication interface operable to communicate via the at least one communication network to an external device; and a server comprising:
- a server storage unit to store data from the mosquito control device;
- at least one server communication interface operable to communicate with the mosquito control device and at least one user computing device via the at least one communication network; and
- a server processing unit operable to count a number of times that a mosquito is electrocuted by the electric mosquito control mechanism.

14. The system of claim 13, wherein the server processing unit is further operable to control the heater.

15. The system of claim 14, wherein the server processing unit is further operable to automatically control the heater based on a signal received from the mosquito control device.

16. The system of claim 14, wherein the server processing unit is further operable to control the heater based on a signal received from the user computing device.

17. The system of claim 13, wherein the server processing unit is further operable to control the carbon dioxide generating device.

18. The system of claim 17, wherein the server processing unit is further operable to automatically control the control the carbon dioxide generating device based on a signal received from the mosquito control device.

19. The system of claim 18, wherein the server processing unit is further operable to control the control the carbon dioxide generating device based on a signal received from the user computing device.

* * * * *